United States Patent [19]
Kurihara

[11] Patent Number: 5,884,045
[45] Date of Patent: Mar. 16, 1999

[54] INFORMATION PROVIDING SYSTEM AND USER TERMINAL

[75] Inventor: Akira Kurihara, Tokyo, Japan

[73] Assignee: Sony Corporation, Tokyo, Japan

[21] Appl. No.: 617,830

[22] PCT Filed: Jul. 10, 1995

[86] PCT No.: PCT/JP95/01372

§ 371 Date: Mar. 8, 1996

§ 102(e) Date: Mar. 8, 1996

[87] PCT Pub. No.: WO96/02037

PCT Pub. Date: Jan. 25, 1996

[30] Foreign Application Priority Data

Jul. 8, 1994 [JP] Japan .................................. 6-156864

[51] Int. Cl.⁶ .......................... G06F 13/38; G06F 15/17; G06F 17/30
[52] U.S. Cl. ................ 395/200.67; 395/200.47; 705/26
[58] Field of Search .................................... 395/226, 227, 395/200.47, 200.48, 200.49, 762, 774, 200.67, 200.59; 705/26, 27; 707/501, 513

[56] References Cited

U.S. PATENT DOCUMENTS 5,671,411   9/1997   Watts et al. .

FOREIGN PATENT DOCUMENTS 3-22084    1/1991   Japan .
3-119850   5/1991   Japan .
4-238572   8/1992   Japan .
WO 94/03865 2/1994  WIPO .

*Primary Examiner*—Mark H. Rinehart
*Attorney, Agent, or Firm*—Frommer Lawrence & Haug, LLP.,; William S. Frommer; Dennis M. Smid

[57] ABSTRACT

An information providing system according to this invention comprises a center for providing information, and at least one user terminal connected to the center through a predetermined communication network and adapted for accepting offer of information from the center. The user terminal receives information transmitted from the center through the predetermined communication network to display the received information on a display and to store, as past record information, a portion of information received in the past. When user designates desired one of the stored past record information, the user terminal transmits, to the center, an instruction signal for instructing offer of information corresponding to desired past record information. The center receives the instruction signal transmitted from the user terminal to read out information corresponding to the received instruction signal from provided information memory means to transmit it to the user terminal. Thus, user can simply and immediately receive desired information from the center without repeating the operation for selecting item from the menu picture for specifying desired information required in the conventional system.

20 Claims, 9 Drawing Sheets

(ON LINE SHOPPING SYSTEM)

INFORMATION PROVIDING SYSTEM AND USER TERMINAL

This invention relates to an information providing system and a user terminal, and more particularly relates to an information providing system and a user terminal suitable when used in the case where, e.g., a center for providing information and user terminals are connected through telephone lines to construct, e.g., shopping system to retrieve desired information from the center.

BACKGROUND ART

For example, in personal computer communication, etc., in the case where user provides an access to data base to retrieve desired data, he carried out retrieval in a hierarchical manner. Namely, a predetermined menu picture is first transmitted from a center for providing information (hereinafter referred to as an information providing unit) to a user terminal equipment. Thus, user selects item relating to information to be retrieved from the menu picture. The information providing unit transmits a new menu picture to the user terminal equipment in accordance with the selection. The user further selects item relating to desired data from the new menu picture.

The user repeats, plural times, such select operations, thus making it possible to ultimately retrieve desired data.

As stated above, in the conventional system, even if access to the same data was provided in the past, access to desired information had to be provided by repeating, plural times, select operations in accordance with the similar procedure from the beginning every time. As a result, the operation was troublesome and inconvenient.

In addition, there were problems that overhead in point of time required for obtaining desired information is prolonged, and the rental fee for the telephone circuit and/or the data base, etc. become expensive.

This invention has been made in view of such circumstances, and its object is to provide an information providing system and a user terminal capable of providing access to desired information more immediately.

DISCLOSURE OF THE INVENTION

To attain the above-described object, an information providing system according to this invention comprises a center for providing information, and at least one user terminal connected to the center through a predetermined communication network and adapted to accept an offer of information from the center.

The user terminal comprises first receiving means for receiving information transmitted from the center through the predetermined communication network, display means for displaying the information received by the first receiving means on a display, past record memory means for storing a portion of information received in the past as past record information, designating means for designating past record information that user desires of the past record information stored in the past record memory means, and first transmitting means for transmitting, to the center, an instruction signal for instructing offer of information corresponding to the desired past record information.

Moreover, the center comprises second receiving means for receiving the instruction signal transmitted from the user terminal, provided information memory means for storing information to be offered or provided to the user terminal, and second transmitting means for reading out information corresponding to the instruction signal from the provided information memory means to transmit it to the user terminal.

The past record information includes, e.g., information ID included in received information, name of the received information, and the number of receiving times of the received information. The information ID, the name of the information and the number of receiving times are caused to correspond to each other. The user terminal stores past record information into the past record memory means, and increments the number of receiving times when the information ID has been already stored to update past record information. When user designates desired one of the past record information, the user terminal transmits, to the center, an instruction signal for instructing offer of information corresponding to desired past record information. Responding to this, the center reads out information corresponding to the instruction signal from the provided information memory means to transmit it to the user terminal.

BEST MODE FOR CARRYING OUT THE INVENTION

Figure 1:
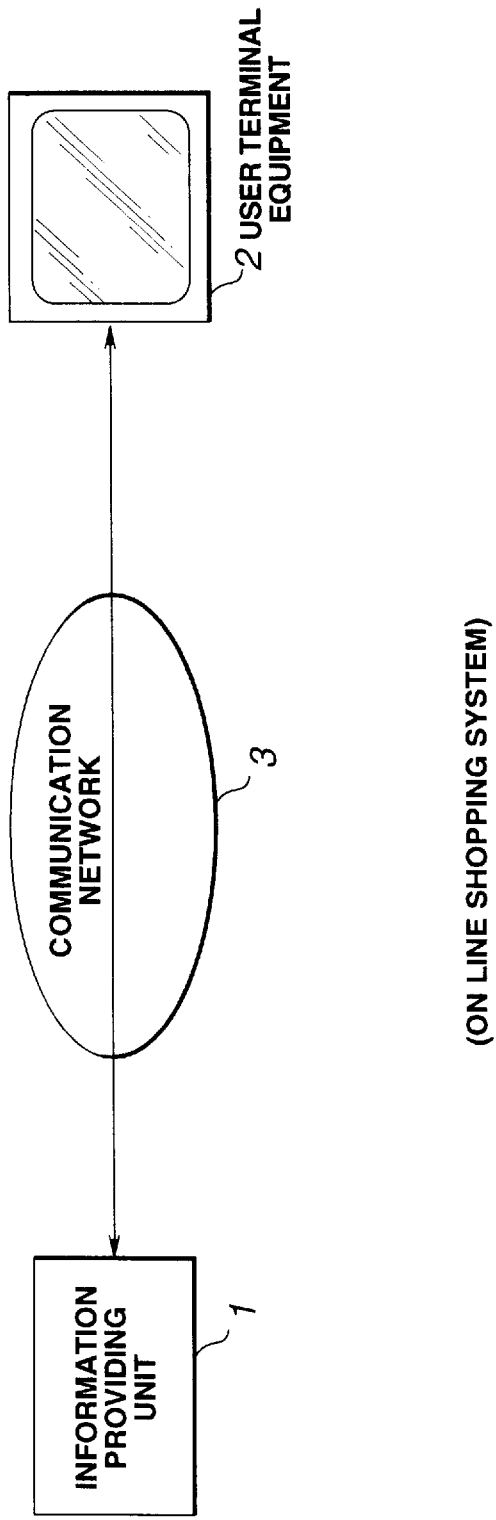
FIG. 1 is a block diagram showing the entire configuration of an information providing system to which this invention is applied.

A preferred embodiment of an information providing system and a user terminal according to this invention will now be described with reference to FIGS. 1 to 3. FIG. 1 is a block diagram showing the entire flow of information in the information providing system to which this invention is applied.

Figure 2:
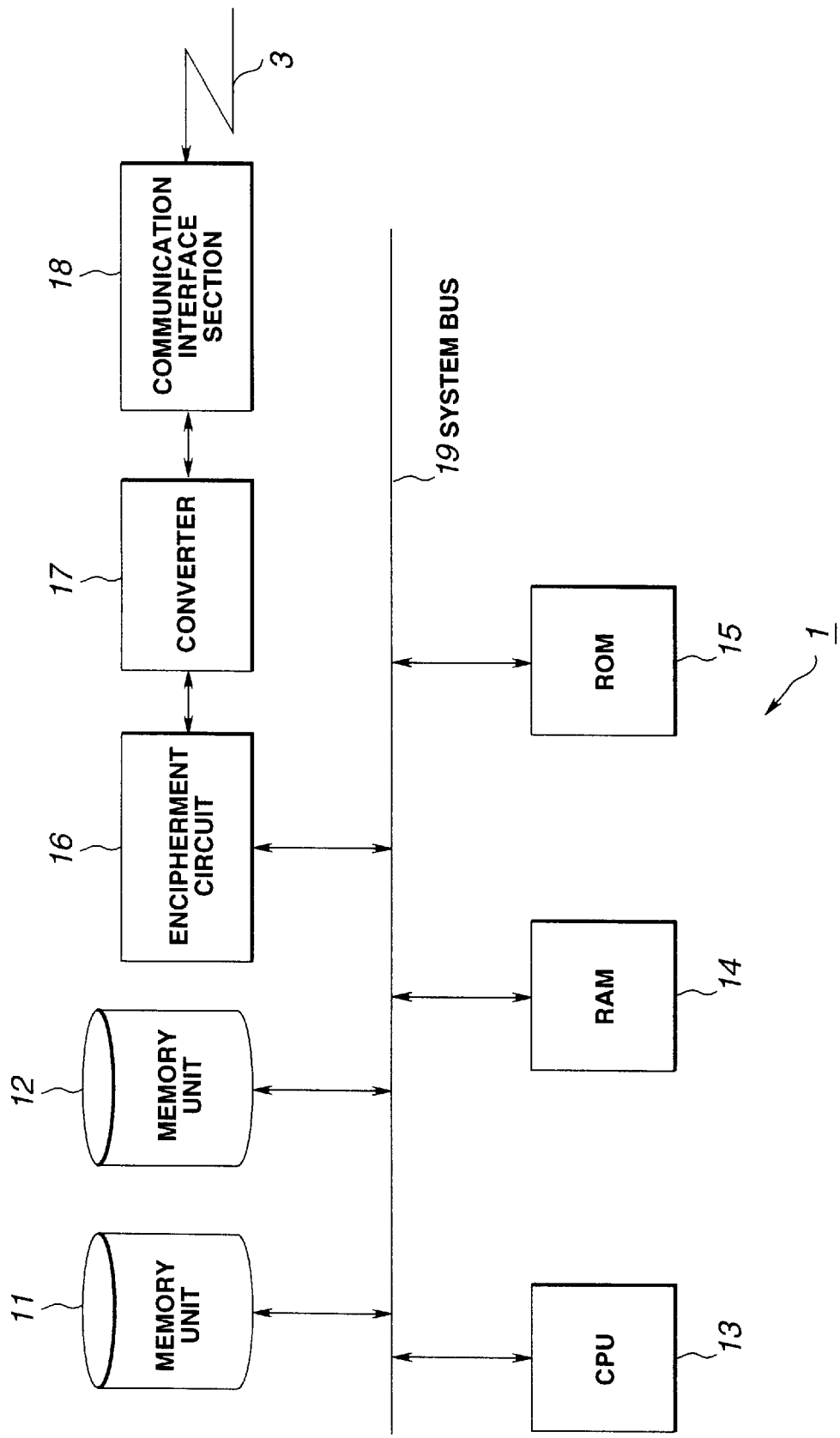
FIG. 2 is a block diagram showing an example of the configuration of information providing unit of FIG. 1.

In FIG. 1, a center for providing information (hereinafter referred to as an information providing unit) 1 is a unit for allowing an information providing person (provider) to offer (provide) information to user, and is constituted as shown in FIG. 2, for example, in more practical sense. A user terminal equipment 2 is adapted to accept offer of information from the information providing unit 1, and is constituted as shown in FIG. 3, for example, in more practical sense. The information providing unit 1 and the user terminal equipment 2 are connected by way of a predetermined communication network 3, e.g., telephone line or ISDN, etc. so that information can be caused to undergo transmission in a bidirectional fashion.

In FIG. 2, a memory unit 11 stores information to be offered to user. A memory unit 12 stores management information of user such as charging information and/or telephone number, etc. every user.

An encipherment circuit 16 implements encipherment (cryptographic) processing to information sent out from the information providing unit 1 in accordance with the system, e.g., DES, FIEL, RSA, etc. A converter 17 converts the enciphered information into a predetermined signal suitable for transmission. A communication interface section 18 is an interface section with respect to the communication network 3.

Execution program for working the information providing unit 1 and management information for the memory unit 11 are stored in a ROM 15. A RAM 14 stores information indicating the present circumstances. A CPU 13 executes execution program. A system bus 19 consists of data bus, address bus and control bus, etc. for connecting respective circuits and/or units.

Figure 3:
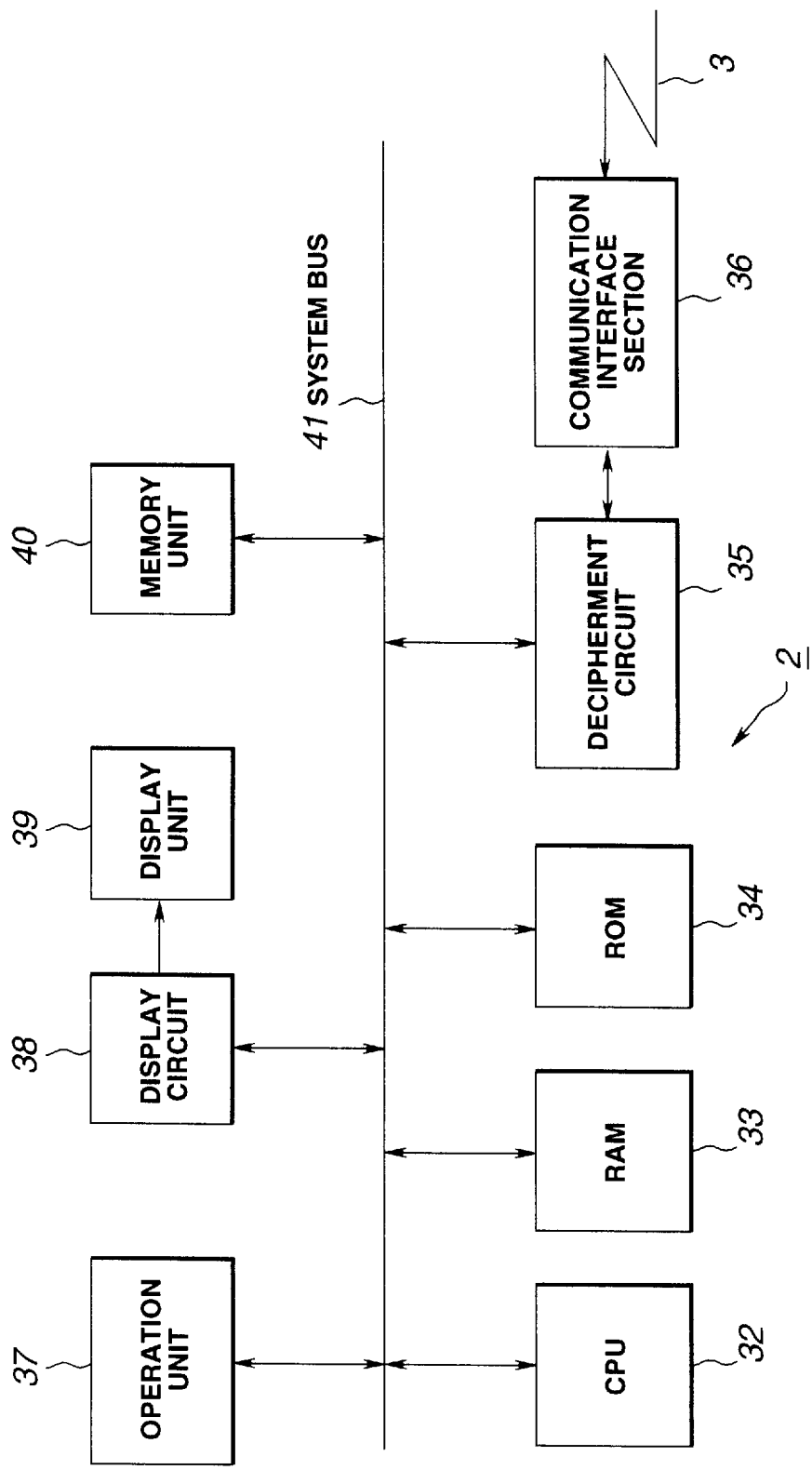
FIG. 3 is a block diagram showing an example of the configuration of user terminal equipment of FIG. 1.

In FIG. 3, a memory unit 40 stores ID (address) of information received from the information providing unit 1. A decipherment circuit 35 implements decipherment (cryptoanalytic) processing to information sent out from the information providing unit 1. A communication interface section 36 is an interface section with respect to the communication network 3.

A RAM 33 stores temporary information of control program, etc. A ROM 34 stores therein execution program and management information for the user terminal equipment 2. A CPU 32 executes execution program.

A display circuit 38 implements signal processing to information from the information providing unit 1 so that it can be displayed on a display unit 39 such as television monitor, etc. An operation unit 37 is operated by user and serves to carry out an operation to select a desired item from information displayed on the display unit 39, or the like. A system bus 41 consists of data bus, address bus and control bus, etc. for connecting respective circuits and/or units.

Figure 4:
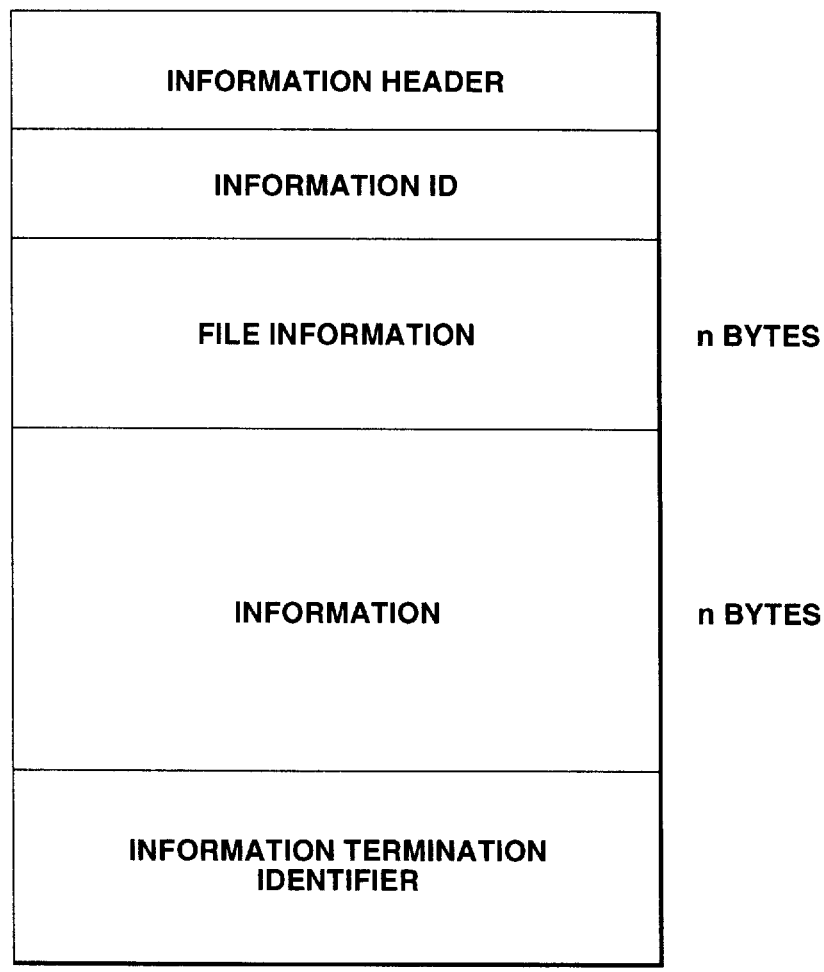
FIG. 4 is a view for explaining format for transmission between the information providing unit and the user terminal equipment of FIG. 1.

FIG. 4 shows a format of data in the case where information is transmitted from the information providing unit 1 to the user terminal equipment 2. As shown in this figure, information header indicating the leading portion of information is allocated to the leading portion, and information ID (identification) for identifying information is allocated succeedingly (subsequently) thereto. Numbers are regularly assigned (allocated) to the information ID in accordance with classification of data.

As file information, data name (e.g., name of goods), preparation date of data, kind of data (e.g., shopping, video, etc.), classification of data (e.g., category such as clothes, foods, etc.), characteristic of data (e.g., information as to whether or not text information, graphic information or moving picture, etc. is included), and data quantity are allocated. This serves to facilitate retrieval from user. Namely, user suitably selects and designates predetermined information of preparation date of data, kind of data, classification of data, characteristic of data and data quantity, thereby making it possible to select desired information from large number of information.

Substantial information to be offered to user are allocated to the area succeeding (subsequent) to the file information. Information termination identifier indicating termination of information is allocated last.

Explanation will now be given with reference to the flowchart of FIG. 5 in connection with the operation in which, in the above-mentioned information providing system, user provides an access to the information providing unit 1 through the user terminal equipment 2 to retrieve desired information.

Initially, at step 101, user carries out line connection processing. Namely, when user operates the operation unit 37 of the user terminal equipment 2 shown in FIG. 3 to instruct access to the information providing unit 1, the CPU 32 controls the communication interface section 36 to allow it to execute the line connection processing. When command (instruction) from the CPU 32 is received, the communication interface section 36 reads out telephone number of the information providing unit 1 stored in advance in the memory unit 40 to start calling operation with respect to that telephone number. When the information providing unit 1 responds to this calling operation, the processing operation proceeds to step 102. Thus, the CPU 32 executes transmitting processing of user ID standardized by the ISDN. Namely, the CPU 32 uses user/user information within the call setting message to transmit user ID and pass word to the information providing unit 1 through the communication interface section 36.

When the information providing unit 1 receives the user ID through the communication interface section 18 shown in FIG. 2, it executes certification processing of user at step 103. Namely, the CPU 13 of the information providing unit 1 retrieves user management information in the memory unit 12 on the basis of the user ID and the pass word which have been received to judge whether or not user of the user ID is normal user.

Figure 6:
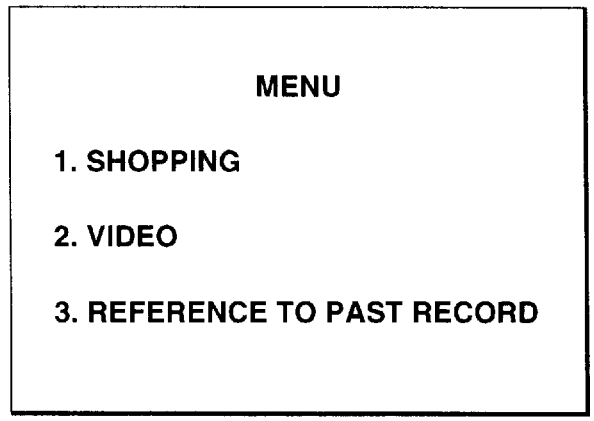
FIG. 6 is a view showing an example of initial menu picture of step 104 of FIG. 5.

In the case of access from the normal user, the CPU 13 transmits data of the initial menu picture to the user terminal equipment 2 through the communication interface section 18. When the user terminal equipment 2 receives the initial menu picture data through the communication interface section 36, it outputs that data to the display unit 39 through the display circuit 38 to allow the display unit 39 to display such picture data. Namely, the CPU 32 of the user terminal equipment 2 executes the initial menu picture receiving processing of step 104 and the initial menu picture display processing of step 105. Thus, the initial menu picture image is displayed on the display unit 39 as shown in FIG. 6, for example.

The processing operation then proceeds to step 106. Thus, the CPU 32 judges whether or not command (instruction) indicative of reference to past record is inputted. In the case where such command is not inputted, the processing operation proceeds to step 107 to execute retrieval processing of information. Namely, when user operates the operation unit 37 to instruct retrieval of information of shopping from the menu of FIG. 6, for example, the CPU 32 notifies the information providing unit 1 that retrieval of information of shopping has been selected. When the CPU 13 of the information providing unit 1 receives this notice, it transmits data of the menu picture image of information relating to shopping stored in the memory unit 11 to the user terminal equipment 2. When the CPU 32 of the user terminal equipment 2 accepts offer of this information (step 108), it allows the display unit 39 to display such information thereon (step 109). Thus, e.g., a list of goods that user desires to purchase is displayed.

When user selects, e.g., clothes from the display, that select signal is transmitted to the information providing unit 1. When the CPU 13 of the information providing unit 1 receives input of select command of clothes, it reads out data of menu picture relating to the clothes from the memory unit 11 to transmit it to the user terminal equipment 2. When the CPU 32 of the user terminal equipment 2 accepts offer of data of menu picture image for selecting the clothes, it allows the display unit 39 to display such picture data thereon. Thus, further detailed select items, such as, for example, lady's clothes, gentleman's clothes, and children's clothes, etc. are displayed. Thus, user further selects desired item from the further detailed select items.

It should be noted that when delivering such information to the user terminal equipment 2, the information providing unit 1 enciphers that data by the encipherment circuit 16 to transmit it. In the user terminal equipment 2, the data thus enciphered is deciphered (decoded) at the decipherment circuit 35 to allow the display unit 39 to display it thereon.

In a manner as stated above, the processing operations of steps 107 to 110 are repeatedly executed until user selects desired goods.

When the user ultimately selects the desired goods, he operates the operation unit 37 to instruct completion of selection of that article. When it is judged at step 110 that such command has been inputted, the processing operation proceeds to step 111. Thus, the CPU 32 of the user terminal equipment 2 executes past record updating processing of information ID.

Figure 7:
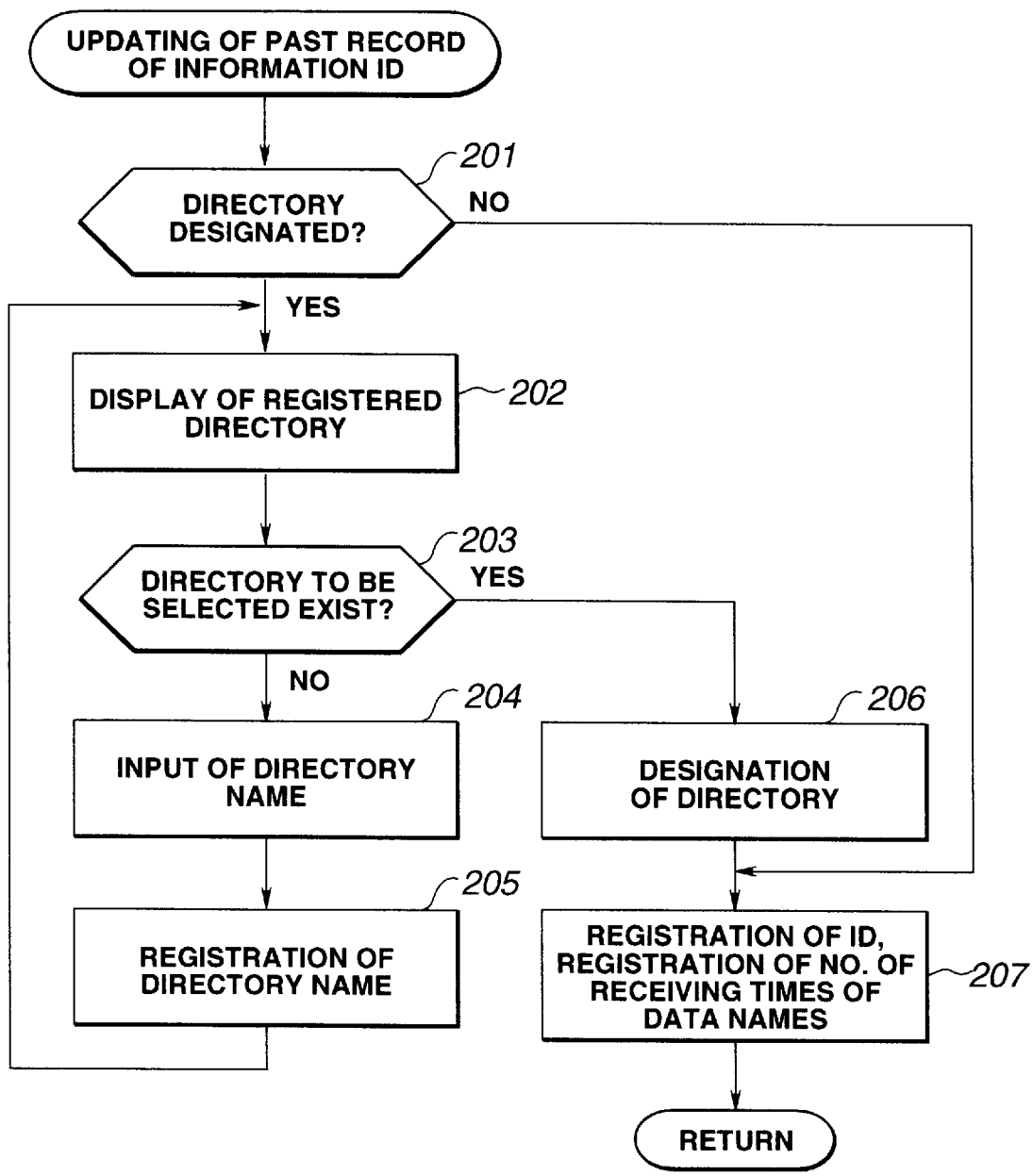
FIG. 7 is a flowchart for explaining past record updating processing of information ID of step 111 of FIG. 5.

The detail of the past record updating processing of the information ID is shown in the flowchart of FIG. 7.

Initially, the CPU 32 of the user terminal equipment 2 judges at step 201 whether or not command designating directory of goods (article) ultimately selected is inputted. Namely, in the case where user desires to register information of goods which has been accessed now into the category (directory) in his manner, he can register that directory. In this case, user operates the operation unit 37 to instruct designation of the directory.

Figure 8:
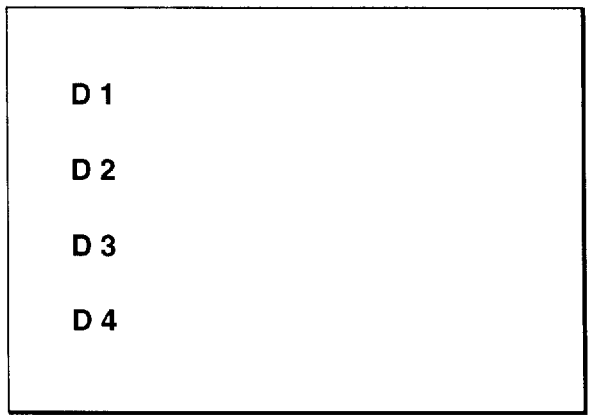
FIG. 8 is a view showing an example of display of directory of step 202 of FIG. 7.

When designation of the directory is inputted, the processing operation proceeds to step 202. Thus, the CPU 32 reads out the directory already registered from the memory unit 40 to allow the display unit 39 to display it thereon. Thus, the directories already registered are displayed on the display unit 39 as shown in FIG. 8, for example. In the example of display of FIG. 8, four directories of D1 to D4 are displayed.

User judges at step 203 whether or not there exists directory caused to correspond to the article (goods) which has been selected now from these directories. In the case where the directory which allows the information which has been accessed now to correspond thereto does not exist in the already registered (displayed) directories, the processing operation proceeds to step 204. Thus, user operates the operating unit 37 to input name of a directory newly supplemented. When the CPU 32 receives input of this name, it allows the memory unit 40 to register that name as a name of the new directory at step 205.

Then, the processing operation returns to the step 202 for a second time. As a result, the registered directories are displayed. Thus, the directory supplemented at the step 204 is displayed on the display unit 39.

On the other hand, in the case where the directory corresponding to information which has been accessed exists in the directories displayed on the display unit 39, user operates the operation unit 37 to designate that directory at step 206. The CPU 32 allows the memory unit 40 to register, at step 207, ID corresponding to the information ultimately selected in correspondence with the directory designated at the step 206. Moreover, at this time, the CPU 32 carries out retrieval as to whether or not the same ID has been already registered in the memory unit 40. In the case where the same ID is registered, the number of receiving times thereof is incremented by 1. Further, the number of receiving times (operations) is also registered into the memory unit 40.

In the case where it is judged by user at the step 201 that there is no need to designate the directory, the processing operations of steps 202 to 206 are skipped. Thus, the processing of the step 207 is immediately executed.

In a manner as described above, the ID of information which have been accessed in the past and the number of receiving times thereof are suitably registered into the memory unit 40 as past record of information ID in correspondence with the directories.

Figure 5:
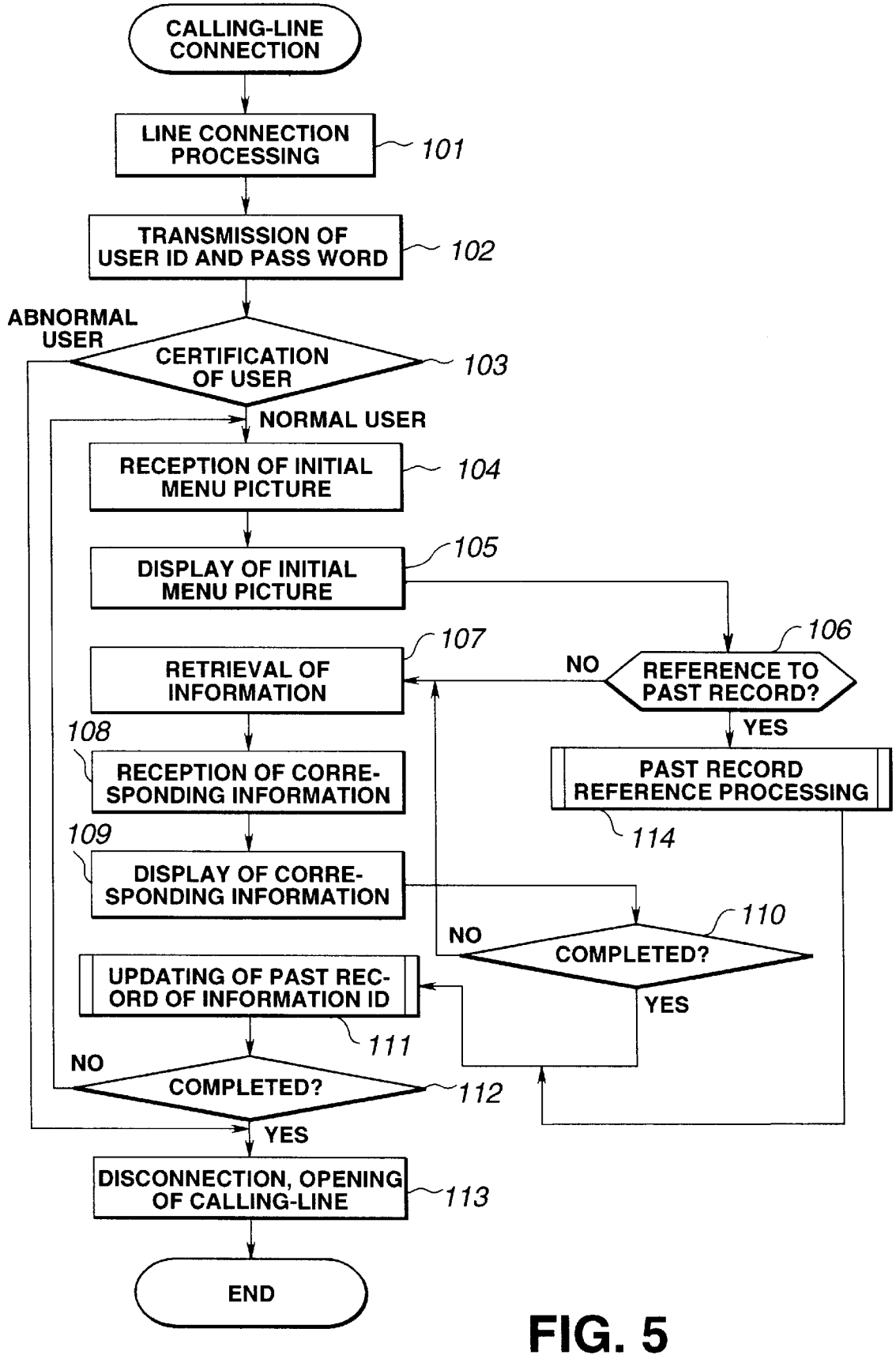
FIG. 5 is a flowchart for explaining actual operation of the information providing system of FIG. 1.

After the past record updating processing of information ID is carried out in a manner as described above, the processing operation proceeds to step 112 of FIG. 5. Thus, whether or not completion of shopping is instructed is judged. In the case where completion (end) is not instructed, the processing operation returns to the step 104. As a result, the initial menu picture image is displayed. Thus, similar processing is repeatedly executed.

On the other hand, in the case where user completes access, he operates the operation unit 37 to instruct the CPU 32 to carry out completion of access. At this time, processing operation proceeds to step 113. Thus, the CPU 32 controls the communication interface section 36 to open connection with respect to the information providing unit 1 to complete the processing.

It is to be noted in the case where it is judged at the step 103 that current access is not access from normal user, the processing operation immediately proceeds to the step 113. Thus, disconnection/opening processing is executed.

In the case where, as described above, user carries out access to the information providing unit 1 to attempt to provide, for a second time, access to information which has been accessed in the past even for once, he selects the item of reference to past record in the initial menu picture display state shown in FIG. 6. At this time, the processing operation proceeds from the step 106 to step 114 of FIG. 5. Thus, the past record reference processing is executed. The detail of the past record reference processing is shown in the flowchart of FIG. 9.

Figure 10:
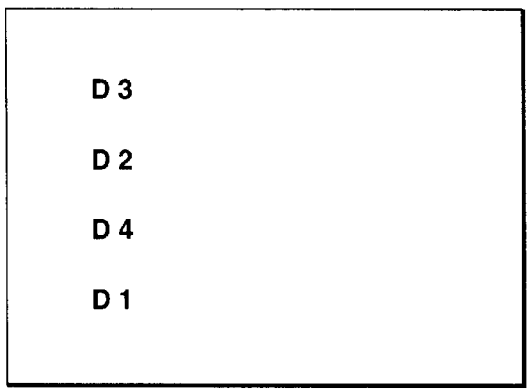
FIG. 10 is a view showing an example of display of past record information of step 301 of FIG. 9.

Namely, when command (instruction) indicative of reference to past record is inputted from the operation unit 37, the CPU 32 of the user terminal equipment 2 executes display processing of past record information at step 301. Thus, past record (list) of data name corresponding to the information ID stored in the memory unit 40 is read out, and is displayed on the display unit 39 through the display circuit 38. At this time, the CPU 32 carries out a control, as shown in FIG. 10, for example, so that the directories registered by the processing shown in the flowchart of FIG. 7 are displayed in order of higher frequency of accessing (the number of receiving times). The directories D1 to D4 shown in FIG. 10 are registered in order of D1 to D4 as shown in FIG. 8. In this case, however, since the access frequencies subsequent thereto are adapted to be in order of D3, D2, D4, D1, directories are displayed in this order.

At step 201 of FIG. 7, in the case where user does not designate directory, past records are displayed every data name, kind of data, classification of data, characteristic of data and data quantity which have been described as the file information of FIG. 4.

Figure 9:
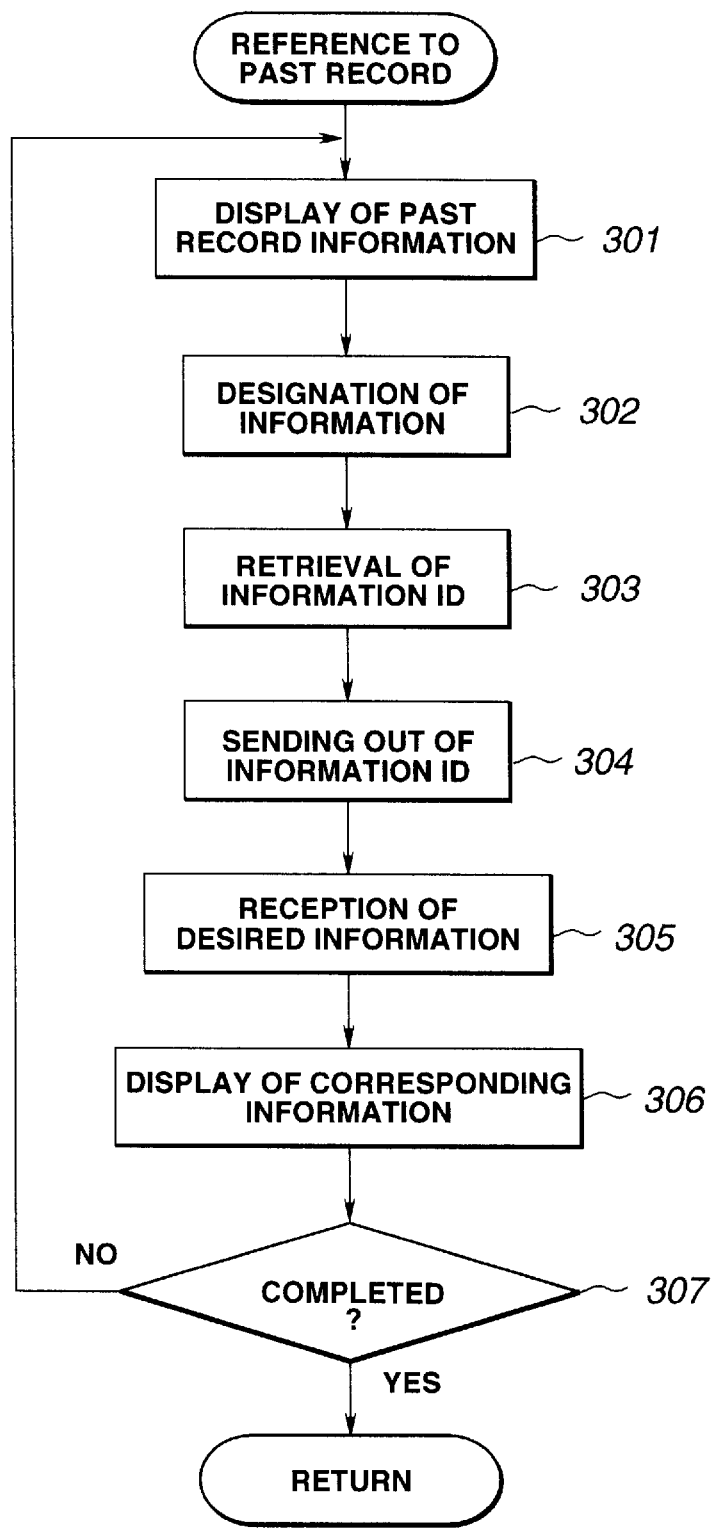
FIG. 9 is a flowchart for explaining past record reference processing of step 114 of FIG. 5.

Then, the processing operation proceeds to step 302 of FIG. 9. Thus, user carries out designation of information. Namely, user operates the operation unit 37 to select directory to be accessed from now on in the state where directories to which information that user has accessed in the past belong are displayed on the display unit 39 as shown in FIG. 10, for example. When desired directory is selected, the CPU 32 reads out, from the memory unit 40, list of information (data name) belonging to that directory to allow the display unit 39 to display it thereon.

Figure 11:
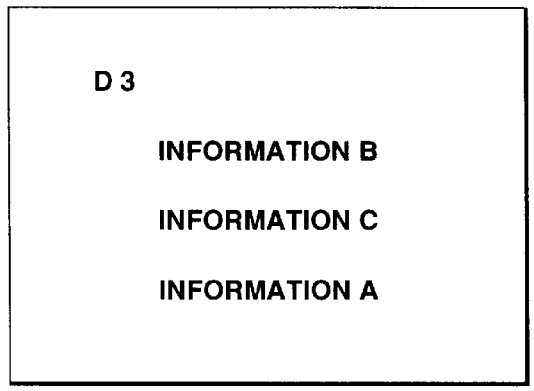
FIG. 11 is a view showing an example of display of past record information of the step 301 of FIG. 9.

When user selects directory D3 in the state shown in FIG. 10, for example, information which belong to the directory D3 and have been accessed in the past are displayed as shown in FIG. 11. Also in this case, respective information are displayed in order of higher access frequency.

Figure 12:
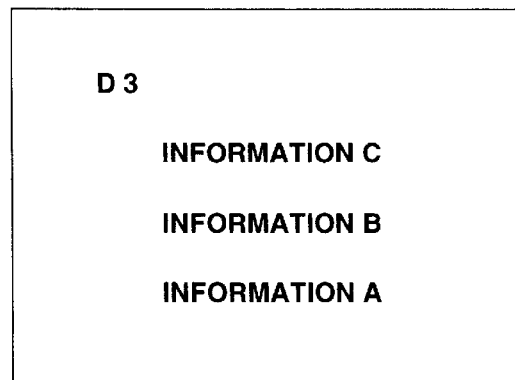
FIG. 12 is a view showing an example of display of past record information of the step 301 of FIG. 9.

In the embodiment of FIG. 11, information B, C, A (data names) are displayed as information which belong to the directory D3 and have been accessed in the past. In this case, however, since the information B has the highest access frequency, and the information C and A have access frequencies lower than that of the information B in the recited order, information B, information C and information A are displayed in order as shown in FIG. 11. While these information are registered into the memory unit 40 in order of information A, information B and information C as order of registration, in the case where information (access) frequencies are the same, display is carried out from the latest information as shown in FIG. 12, for example.

User repeats similar operation at step 302 until information to be accessed from now on is displayed on the display unit 39. When designation of information is ultimately carried out, the processing operation proceeds to step 303. Thus, the CPU 32 retrieves information ID of the designated information from the memory unit 40. Namely, since past records of information ID of information accessed in the past are registered in the memory unit 40 at the step 207 of FIG. 7 as described above, the information ID of the designated information is retrieved therefrom. At step 304, this information ID is transmitted (sent out) to the information providing unit 1.

When the CPU 13 of the information providing unit 1 receives the information ID, it reads out information corresponding to the information ID from the memory unit 11 to transmit it to the user terminal equipment 2. The CPU 32 of the user terminal equipment 2 receives information transmitted from the information providing unit 1 at step 305, and allows the display unit 39 to display it thereon at step 306.

When any one of information which were accessed in the past is designated in this way, the operation for accepting offer of that information is automatically carried out. For this reason, user can immediately accept offer of desired information.

Subsequently, at step 307, whether or not completion of past record reference processing is instructed is judged. In the case where instruction of completion is not inputted, the processing operation returns to the step 301. Thus, the above-described operation is repeatedly executed.

In the case where completion of the past record reference processing is instructed by operating the operation unit 37, the CPU 32 completes the past record reference processing. Thereafter, the processing operation returns to the step 111 of FIG. 5. Thus, the past record updating processing of information ID is executed.

In the case where an access to the information which has been accessed in the past is made for a second time as stated above, user only designates corresponding information from the list of the information, thereby making it possible to automatically accept offer of that information. For this reason, user can conveniently order goods regularly required in the case of, e.g., on line shopping, etc., or the like.

While explanation has been given by the example of the on line shopping in the above-described embodiment, this invention can be applied to the case where user accepts offer of video information of movie or game.

INDUSTRIAL APPLICABILITY

As described above, in accordance with the information providing system of this invention, a scheme is employed to store past record of information received from the center, whereby when a predetermined one of the stored past records is designated, the center is instructed to provide information corresponding to the designated past record. Accordingly, there results less overhead for accepting offer of predetermined information, thus making it possible to immediately accept offer of information. In addition, e.g., the rental fee for the telephone circuit and/or the data base of the center can be reduced to more degree as compared to the conventional system.

What is claimed is:

1. An information providing system comprising:

a center for providing information; and at least one user terminal connected to the center through a predetermined communication network and adapted for accepting offer of information from the center, the user terminal comprising:

first receiving means for receiving information transmitted from the center through the predetermined communication network, display means for displaying, on a display, information received by the first receiving means, past record memory means for storing a portion of information received in the past as past record information, designating means for user selecting and designating more than one of the following predetermined information data of the past record information: preparation date of data, kind of data, classification of data, characteristic of data, and data quantity of said portion of the past record information stored in the past record memory means, and first transmitting means for transmitting, to the center, an instruction signal for instructing offer of information corresponding to the selected past record information, the center comprising:

second receiving means for receiving the instruction signal transmitted from the user terminal, provided information memory means for storing information to be offered or provided to the user terminal, and second transmitting means for reading out information corresponding to the instruction signal from the provided information memory means to transmit to the user terminal.

2. An information providing system as set forth in claim 1, wherein the past record information includes information ID (identification) included in the received information, name of the received information, and the number of receiving times of the received information, the information ID, the name of the information and the number of receiving times being caused to correspond to each other.

3. An information providing system as set forth in claim 2,
which further comprises:
past record updating means for registering the information ID, the number of receiving times and the name of the information included in the past record information.

4. An information providing system as set forth in claim 3,
wherein the past record updating means comprises:
means for judging whether or not the information ID has been already registered in the past record memory means, and
means for incrementing the number of receiving times in the case where it is judged that the information ID has been already registered.

5. An information providing system as set forth in claim 4,
wherein the past record updating means further comprises,
means such that in the case where the information ID is not registered in the past record memory means, it newly registers the information ID and the number of receiving times of 1 into any area of the past record memory means designated by user.

6. An information providing system as set forth in claim 5,
wherein the past record information is stored into a directory designated by user.

7. An information providing system as set forth in claim 6,
wherein the display means is adapted so that in the case where it displays the past record information on the display, it displays the past record information in an arranged manner in order of the number of receiving times.

8. A user terminal supplied with information from an information providing center comprising:
receiving means for receiving information transmitted from the information providing center through a predetermined communication network,
display means for displaying, on a display, information received by the receiving means,
past record memory means for storing, as past record information, a portion of information received in the past,
designating means for user selecting and designating more than one of the following predetermined information data of the past record information: preparation date of data, kind of data, classification of data, characteristic of data, and data quantity of said portion of the past record information stored in the past record memory means, and
first transmitting means for transmitting, to the center, an instruction signal for instructing offer of information corresponding to the selected past record information.

9. A user terminal as set forth in claim 8,
wherein the past record information includes information ID included in the received information and the receiving number of times of the received information,
the information ID and the receiving number of times being caused to correspond to each other.

10. A user terminal as set forth in claim 9,
which further comprises past record updating means for updating the information ID and the number of receiving times included in the past record information.

11. A user terminal as set forth in claim 10,
wherein the past record updating means comprises:
means for judging whether or not the information ID has been already registered in the past record memory means, and
means such that in the case where it is judged that the information ID has been already registered, it increments the number of receiving times.

12. A user terminal as set forth in claim 11,
wherein the past record updating means further comprises:
means such that in the case where the information ID is not registered in the past record memory means, it newly registers the information ID and the number of receiving times of 1 into any area of the past record memory means designated by user.

13. A user terminal as set forth in claim 12,
wherein the past record information is stored in a directory designated by user.

14. A user terminal as set forth in claim 13,
wherein the display means is adapted so that in the case where it displays the past record information on the display, it displays the past record information in an arranged manner in order of the number of receiving times.

15. An information providing system comprising:
a center for providing information; and
at least one user terminal connected to the center through a predetermined communication network and adapted for accepting offer of information from the center,
the user terminal comprising:
first receiving means for receiving information transmitted from the center through the predetermined communication network,
display means for displaying, on a display, information received by the first receiving means,
past record memory means for storing a portion of information received in the past as past record information,
designating means for designating past record information that user desires of the past record information stored in the past record memory means, and
first transmitting means for transmitting, to the center, an instruction signal for instructing offer of information corresponding to the desired past record information,
the center comprising:
second receiving means for receiving the instruction signal transmitted from the user terminal,
provided information memory means for storing information to be offered or provided to the user terminal, and
second transmitting means for reading out information corresponding to the instruction signal from the provided information memory means to transmit to the user terminal,
wherein the past record information includes information ID (identification) included in the received information, name of the received information, and the number of receiving times of the received information,
the information ID, the name of the information and the number of receiving times being caused to correspond to each other,
past record updating means for registering the information ID, the number of receiving times and the name of the information included in the past record information, wherein the past record updating means comprises:

means for judging whether or not the information ID has been already registered in the past record memory means, and means for incrementing the number of receiving times in the case where it is judged that the information ID has been already registered, wherein the past record updating means further comprises, means such that when the information ID is not registered in the past record memory means, it newly registers the information ID and the number of receiving times in any area of the past record memory means designated by user.

16. An information providing system as set forth in claim 15, wherein the past record information is stored in a directory designated by user.

17. An information providing system as set forth in claim 16, wherein the display means is adapted to display the past record information on the display in an arranged manner in order of the number of receiving times.

18. A user terminal supplied with information from an information providing center comprising:

receiving means for receiving information transmitted from the information providing center through a predetermined communication network, display means for displaying, on a display, information received by the receiving means, past record memory means for storing, as past record information, a portion of information received in the past, designating means for designating past record information that user desires of the past record information stored in the past record memory means, and first transmitting means for transmitting, to the center, an instruction signal for instructing offer of information corresponding to the desired past record information, wherein the past record information includes information ID included in the received information and the receiving number of times of the received information, the information ID and the receiving number of times being caused to correspond to each other, past record updating means for updating the information ID and the number of receiving times included in the past record information, wherein the past record updating means comprises:

means for judging whether or not the information ID has been already registered in the past record memory means, and means such that in the case where it is judged that the information ID has been already registered, it increments the number of receiving times, wherein the past record updating means further comprises:

means such that when the information ID is not registered in the past record memory means, it newly registers the information ID and the number of receiving times in any area of the past record memory means designated by user.

19. A user terminal as set forth in claim 18, wherein the past record information is stored in a directory designated by user.

20. A user terminal as set forth in claim 19, wherein the display means is adapted to display the past record information on the display in an arranged manner in order of the number of receiving times.

* * * * *